(12) United States Patent
Tiger et al.

(10) Patent No.: US 10,481,945 B2
(45) Date of Patent: Nov. 19, 2019

(54) SYSTEM AND METHOD FOR COMMUNICATION MANAGEMENT OF A MULTI-TASKING MOBILE DEVICE

(75) Inventors: Roi Tiger, Tel Aviv (IL); Guy Rosen, Givatayim (IL); Yuval Ariav, Binyamina (IL)

(73) Assignee: FACEBOOK, INC., Menlo Park, CA (US)

( * ) Notice: Subject to any disclaimer, the term of this patent is extended or adjusted under 35 U.S.C. 154(b) by 1242 days.

(21) Appl. No.: 13/351,727

(22) Filed: Jan. 17, 2012

(65) Prior Publication Data

US 2012/0254285 A1 Oct. 4, 2012

Related U.S. Application Data

(63) Continuation-in-part of application No. 13/173,619, filed on Jun. 30, 2011, now Pat. No. 9,559,868.

(Continued)

(51) Int. Cl.
*G06F 15/16* (2006.01)
*G06F 9/46* (2006.01)
(Continued)

(52) U.S. Cl.
CPC ............. *G06F 9/468* (2013.01); *H04L 47/20* (2013.01); *H04L 67/289* (2013.01); *H04L 67/2833* (2013.01); *H04W 4/18* (2013.01); *H04W 4/60* (2018.02); *H04L 47/14* (2013.01); *H04W 52/0261* (2013.01); *Y02D 70/00* (2018.01); *Y02D 70/122* (2018.01);

(Continued)

(58) Field of Classification Search
CPC ............. H04L 67/2828; H04L 67/2814; H04L 67/2833; H04L 67/289
See application file for complete search history.

(56) References Cited

U.S. PATENT DOCUMENTS 5,935,212 A * 8/1999 Kalajan ............... H04L 63/0428
709/203
6,366,947 B1 * 4/2002 Kavner ............. G06F 17/30902
707/E17.12

(Continued)

OTHER PUBLICATIONS

Mark Murphy. "TrafficMonitorActivity.java". uploaded on Aug. 19, 2011. 117 lines. downloaded from https://github.com/commonsguy/cw-andtuning/blob/master/TrafficMonitor/src/com/commonsware/android/tuning/traffic/TrafficMonitorActivity.java.*

(Continued)

*Primary Examiner* — Benjamin M Thieu (57) ABSTRACT

A mobile device and method for management of communication from a mobile device capable of multi-tasking. The method includes capturing a request from at least one application executed on the mobile device for data communication through a network interface of the mobile device; identifying the at least one application by interrogation of an operating system of the mobile device; determining for the identified one application data communication access rights; and autonomously communicating through the network interface for the at least one application and independently communicating with the at least one application without interfering with normal operation of the at least one application, when the data communication access rights require regulating bandwidth usage by the at least one application.

16 Claims, 4 Drawing Sheets

Related U.S. Application Data (60) Provisional application No. 61/559,181, filed on Nov. 14, 2011, provisional application No. 61/470,549, filed on Apr. 1, 2011.

(51) Int. Cl.
| | | |
|---|---|---|
| *H04W 4/18* | (2009.01) | |
| *H04L 12/813* | (2013.01) | |
| *H04L 29/08* | (2006.01) | |
| *H04W 4/60* | (2018.01) | |
| *H04L 12/801* | (2013.01) | |
| *H04W 52/02* | (2009.01) | |

(52) U.S. Cl.
CPC ........ *Y02D 70/124* (2018.01); *Y02D 70/1262* (2018.01); *Y02D 70/142* (2018.01)

(56) References Cited

U.S. PATENT DOCUMENTS

| | | | |
|---|---|---|---|
| 6,697,839 B2 | 2/2004 | Sini et al. | |
| 7,155,519 B2 | 12/2006 | Lo et al. | |
| 7,277,915 B2 | 10/2007 | De Boor et al. | |
| 7,444,506 B1* | 10/2008 | Datta | H04L 63/0428 370/238 |
| 7,752,292 B1 | 7/2010 | Katzer | |
| 7,873,074 B1* | 1/2011 | Boland | 370/468 |
| 7,899,847 B2 | 3/2011 | Lau et al. | |
| 7,966,387 B1 | 6/2011 | Katzer | |
| 8,006,224 B2 | 8/2011 | Bateman et al. | |
| 8,036,718 B2* | 10/2011 | Lencevicius | H04M 1/663 455/127.1 |
| 8,185,607 B1* | 5/2012 | Arzur | H04W 4/18 709/203 |
| 8,255,716 B2* | 8/2012 | Mandyam | H04W 52/0258 370/311 |
| 8,422,984 B2* | 4/2013 | Chin | H04W 52/0241 370/311 |
| 8,521,238 B2* | 8/2013 | Lencevicius | H04M 1/663 455/127.1 |
| 8,745,373 B2* | 6/2014 | Molsberry | H04L 63/0428 713/153 |
| 8,769,320 B2* | 7/2014 | Mandyam | H04W 52/0258 370/311 |
| 9,015,822 B2* | 4/2015 | Bathrick | H04L 45/00 709/230 |
| 2002/0162024 A1* | 10/2002 | Cunchon | H04L 63/104 726/12 |
| 2004/0116117 A1* | 6/2004 | Ahvonen | H04L 29/06 455/432.3 |
| 2004/0204183 A1* | 10/2004 | Lencevicius | H04M 1/663 455/574 |
| 2005/0108020 A1* | 5/2005 | Lehavi | H04L 12/58 709/206 |
| 2005/0281233 A1* | 12/2005 | Parker | H04W 76/02 370/338 |
| 2006/0200738 A1 | 9/2006 | Tarle et al. | |
| 2006/0258341 A1 | 11/2006 | Miller et al. | |
| 2007/0043940 A1* | 2/2007 | Gustave | H04L 63/0272 713/150 |
| 2007/0177575 A1* | 8/2007 | Osenbach | H04L 12/4641 370/351 |
| 2007/0259676 A1 | 11/2007 | Golla | |
| 2008/0320151 A1* | 12/2008 | McCanne | H03M 7/30 709/228 |
| 2008/0320154 A1* | 12/2008 | Demmer | H04W 4/02 709/229 |
| 2009/0157888 A1* | 6/2009 | Demmer | H04W 4/02 709/229 |
| 2009/0197528 A1* | 8/2009 | Chin | H04W 52/0241 455/39 |
| 2009/0248670 A1 | 10/2009 | Fiatal | |
| 2009/0327695 A1* | 12/2009 | Molsberry | H04L 63/20 713/151 |
| 2010/0037130 A1 | 2/2010 | Jakubowski | |
| 2010/0095021 A1* | 4/2010 | Samuels et al. | 709/235 |
| 2010/0125901 A1* | 5/2010 | Bathrick | H04L 45/00 726/13 |
| 2010/0169787 A1 | 7/2010 | Boskovic | |
| 2010/0250768 A1* | 9/2010 | Barreto et al. | 709/231 |
| 2010/0303053 A1* | 12/2010 | Akbari et al. | 370/345 |
| 2011/0055613 A1* | 3/2011 | Mandyam | H04W 52/0258 713/340 |
| 2011/0138154 A1* | 6/2011 | Tevis | G06F 17/30153 712/220 |
| 2011/0231517 A1 | 9/2011 | Srinivasan et al. | |
| 2011/0319144 A1* | 12/2011 | Lencevicius | H04M 1/663 455/574 |
| 2012/0101952 A1* | 4/2012 | Raleigh et al. | 705/304 |
| 2012/0158947 A1* | 6/2012 | Hassan et al. | 709/224 |
| 2012/0324267 A1* | 12/2012 | Mandyam | H04W 52/0258 713/323 |

OTHER PUBLICATIONS

Mark Murphy. "TrafficRecord.java". uploaded on Aug. 19, 2011. 34 lines. downloaded from https://github.com/commonsguy/cw-andtuning/blob/master/TrafficMonitor/src/com/commonsware/android/tuning/traffic/TrafficRecord.java.*

Mark Murphy. "TrafficSnapshot.java". uploaded on Aug. 19, 2011. 32 lines. downloaded from https://github.com/commonsguy/cw-andtuning/blob/master/TrafficMonitor/src/com/commonsware/android/tuning/traffic/TrafficSnapshot.java.*

Author unknown. "Monetizing the Mobile Internet". Published by Cisco. Dated Jul. 2010. 7 pages.*

Microsoft Press. "Microsoft Computer Dictionary". 5th Edition. Published Mar. 15, 2002. pp. 241-242.*

Gerald Combs et al. "Have one application use VPN while others do not in Linux?" Server Fault discussion boards. Aug. 20, 2009. 4 pages. Available online: http://serverfault.com/questions/56597/have-one-application-use-vpn-while-others-do-not-in-linux.*

\* cited by examiner

SYSTEM AND METHOD FOR COMMUNICATION MANAGEMENT OF A MULTI-TASKING MOBILE DEVICE

CROSS REFERENCE TO RELATED APPLICATIONS

This application claims the benefit of U.S. provisional application No. 61/559,181 filed on Nov. 14, 2011. This application is a continuation-in-part of U.S. patent application Ser. No. 13/173,619 filed on Jun. 30, 2011, that claims the benefit of U.S. provisional application No. 61/470,549 filed on Apr. 1, 2011. The contents of the above cited applications are herein incorporated by reference.

TECHNICAL FIELD

The invention generally relates to data transfers of applications executed on a mobile device, and more specifically to a bandwidth management of data consumption by a mobile device capable of multi-tasking.

BACKGROUND OF THE INVENTION

The use of mobile devices in general, and smart phones in particular, has significantly increased. Such devices have become in many cases a primary replacement for other computing devices, allowing access to data by the mobile device to a variety of applications while accessing large amounts of data in both directions, i.e., upload and download of data. Mobile devices typically utilize wireless bandwidth through a wireless local area network (WLAN) or the cellular network. The data bandwidth consumption by a mobile device through the cellular network, either in transfer speed or volume, tends to be expensive, especially when the user is outside of the boundaries of a given data package. Such costs may be further increased when the mobile device is capable of multi-tasking, i.e., execution of multiple applications in parallel. To this end, the multiple applications make asynchronous demands for the data bandwidth over the costly data communication channel. This may be further costly in power consumption of the mobile device that even with the increase of the efficiency of batteries is offset by the additional power required for the wireless communication either through a cellular network or a wireless local area network (WLAN).

Various techniques are used to reduce the data bandwidth consumption by mobile devices. Standard ways to reduce the amounts of data sent to and from the mobile device include a plurality of well-known compression techniques. However, such techniques are limited and further data reduction may be required. This is particularly true with respect to data provided by e-mail applications where it has become customary to attach documents, pictures, video clips and the like which increase significantly the size of the e-mail. In many cases the user does not desire to receive all this data.

A common technique to reduce the amount of data is not to send an e-mail that is over a particular size to the mobile device, but to instead send only certain portions thereof and allow the user to request the download of the rest of the e-mail on demand. The threshold is typically a built-in function on the mobile application and thereon operates automatically, providing certain additional bandwidth savings.

An exemplary protocol that is now widely used for the purpose of such synchronization of a mobile device is the Microsoft ActiveSync® protocol. However, this protocol does not define the kinds of compression or handling of data to reduce the amount of data provided to the mobile device. This decision is typically built-in by the application in general, and the e-mail application in particular. In a typical application, such as the e-mail application on Apple's iPhone®, two separate types of decisions are made by the e-mail application. One has to do with the size of the text in rich or simple format and the other with handling attachments to an e-mail message. The decision is made on a per e-mail basis, therefore it is often the case that unwanted data is automatically downloaded to the mobile device, increasing the user's cost unnecessarily.

However, there are many other applications that use the data communication channel for both upload and download of data. Such applications may be loaded onto the mobile device in open operating systems, such as, for example, an Android™ operating system. Such systems allow for any compatible application to be loaded onto the mobile device. The loaded applications, e.g., office applications, communication applications, game applications, etc., may generate requests for upload or download of data through the data communication channel that may result in significant costs to the user of the mobile device. Currently such applications cannot be configured as to when they can access data communication channels. Thus, the user has limited control over the amount of bandwidth that can be consumed by such applications.

It would be therefore advantageous to provide a solution that overcomes the limitations of currently available applications for mobile devices. It would be further advantageous if such solution would not require changes to the applications that are downloaded to the mobile device.

SUMMARY OF THE INVENTION

Certain embodiments of the invention include a mobile device that comprises an interface to a data communication network; at least one memory unit storing at least one application and a local gateway application communicatively connected to the at least one application, the memory unit further stores an operating system that provides to the local gateway application information respective of the at least one application responsive of an interrogation by the local gateway application, wherein the local gateway application is thereby made dynamically aware of the at least one application for identifying functionality of the at least one application and determination of data handling of data to be communicated over the data communication network; at least one processing unit operative in a multi-tasking mode connected to the at least one memory and connected to the interface for execution of the at least one application and the local gateway application, wherein a data communication attempt by the at least one application through the data communication network is captured by the local gateway application; wherein the local gateway application is communicatively connected to at least a server serving the at least one application through the interface to the data communication network; and wherein the local gateway application autonomously emulates communication of the at least one application over the data network from the at least one application based on the dynamic awareness, the at least one application is unaware of existence of the local gateway application.

Certain embodiments of the invention also include a method for management of communication from a mobile device capable of multi-tasking. The method comprises capturing a request from at least one application executed on the mobile device for data communication through a network interface of the mobile device; identifying the at least one application by interrogation of an operating system of the mobile device; determining for the identified one application data communication access rights; and autonomously communicating through the network interface for the at least one application and independently communicating with the at least one application without interfering with normal operation of the at least one application, when the data communication access rights require regulating bandwidth usage by the at least one application.

Certain embodiments of the invention also include a local gateway application (LGA) for management of communication from a mobile device capable of multi-tasking. The LGA comprises a first interface to at least one application executed on the mobile device, wherein the first interface is configured to capture a request from the at least one application for data communication through a network interface of the mobile device; a second interface to least an operating system of the mobile device, wherein the second interface is configured to interrogate the operating system about a functionality of the at least one application; a policy for determining for the at least one application data communication access rights based in part on the functionality of the at least one application; and a first data link that emulates data communication of the at least one application through the network interface without interfering with normal operation of the at least one application, when the data communication access rights require regulating bandwidth usage by the at least one application; and a second data link that enables the at least one application direct data communication through the network interface, when the data communication access rights does not require regulating bandwidth usage by the at least one application.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE INVENTION

The embodiments disclosed by the invention are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Figure 1:
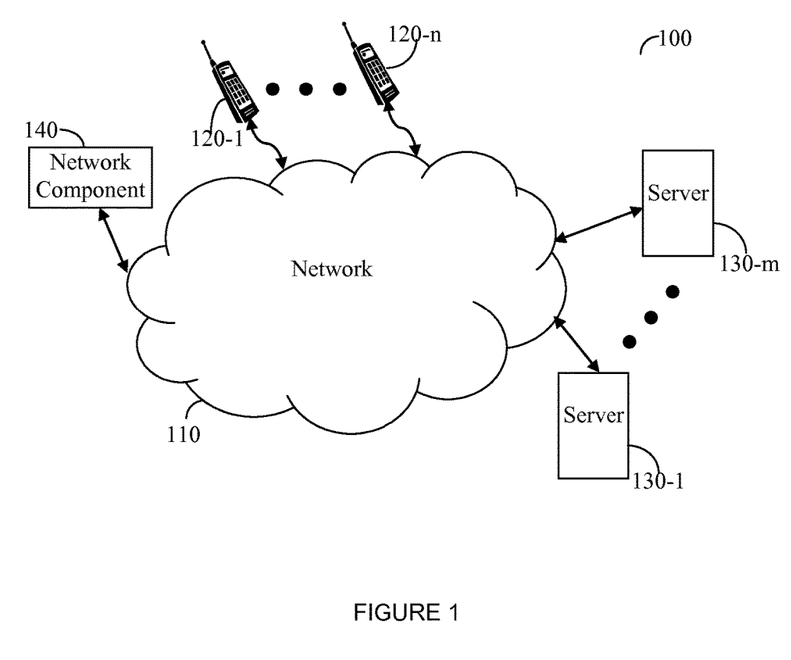
FIG. 1 is a system for communication between a plurality of mobile devices and a plurality of data sources.

According to certain embodiments disclosed herein, it is provided a data communication management, for example, data bandwidth usage, in wireless communication using a local gateway agent (LGA) installed on a mobile device capable of multi-tasking. The LGA captures attempts to access the data network by any application of the mobile device. The LGA determines, without inquiring of the application, if that application may or may not access the data network directly, and if management or handling of any sort is necessary, based on a policy of the LGA, and executing that policy prior to performing such data communication. In one embodiment, the LGA may aggregate access attempts to the data network to reduce load and/or power consumption by the mobile device, either internally or in communication with an external proxy coupled to the data network. FIG. 1 depicts an exemplary and non-limiting system 100 operative in accordance with an embodiment of the invention. A network 110 enables communication between one or more mobile devices 120-1 through 120-N. The network 110 may be wireless, cellular or wired, a local area network (LAN), a wide area network (WAN), a metro area network (MAN), the Internet, the worldwide web (WWW), like networks, and any combination thereof.

The network 110 also enables data communication for each application installed on a mobile device 120-1 through 120-N. Thus, an application installed on a mobile device can utilize upload and download bandwidth from the network 110. In a preferred embodiment, data communication of mobile devices 120-1 to 120-N, and applications installed therein is facilitated through a cellular network (which may be in part network 110). The cellular network may be, for example, a CDMA, GSM, 3G, and LTE cellular network.

The mobile devices 120-1 through 120-N may include, but are not limited to, smart phones, tablet computers, netbook computers, and laptop computers, that are designed to run in a multi-tasking mode. That is, a plurality of applications (also known as APPS) may be executed seemingly in parallel, in accordance with known principles of multi-tasking operation. Examples for such devices may include Apple's iPhone®, Apple's iPAD® as well as Google's Android™ based smart phones and tablet computers.

The mobile devices 120-1 to 120-N communicate wirelessly with the network 110 among others for the purpose of communication with the servers 130-1 through 130-*m*. Such servers 130 may be e-mail servers, web servers, databases, and many other servers capable of receiving and/or providing data to and from the mobile devices 120. All the mobile devices 120-1 to 120-N can receive and transmit data from a cellular network. As mentioned above, such capabilities typically require purchase of a data plan, from the network provider, such that its price is a function of the consumed data bandwidth, in either speed or volume, from the cellular network.

A mobile device, for example, a mobile device 120-*i* (where i=1 . . . N), can communicate with one or more servers 130-1 through 130-*m* the same as the mobile device 120-*i* may communicate for different purposes with different servers 130. For example, and without limitations, a user may communicate using a web browser with a server, for example, server 130-1, for the purpose of accessing an e-mail account with an e-mail server 130-*m*. In a multi-tasking environment of the mobile device 120-*i* such communication may occur in parallel, and in fact some of the access may be performed independent from any user action, for example periodic refreshing of a web page content, or checking an e-mail server for upload of e-mail to the mobile device 120-i.

According to an embodiment disclosed herein, a LGA is an application installed and executed on each of the mobile devices 120-1 to 120-N. In one embodiment, the LGA is downloadable from an application marketplace, such as AppStore by Apple or Android Market. The LGA may be implemented as executable code (e.g., a script) and/or a firmware stored in a readable medium in a mobile device 120, hardware, or any combination thereof. The LGA is executed over the mobile device 120, which maybe any computing device including at least a processor and a non-transient computer readable medium.

The LGA identifies attempts to perform data communication over the network with one or more of servers 130-1 to 130-m. As explained in more detail herein below, the LGA identifies which application attempts data communication based on a transaction, without the need to interrogate, or otherwise register the application attempting such data access. Once identified, the LGA, based on a predefined policy can allow free data communication without going through the LGA or a controlled data communication regulated by the LGA. The controlled data communication may include, but is not limited to, data compression, encryption, authentication, routing, and more.

For example, if an e-mail application on the mobile device 120-i is set to periodically pull an e-mail message from an e-mail server, for example, server 130-m, the LGA may respond to the requesting application with a 'no e-mail' indication and save an access to the network 110. The LGA may further aggregate communication over the data communication channel of the network 110 rather than responding immediately to every request made by an application, thereby reducing data consumption.

In yet another embodiment, an external network component 140 is connected to the network 110. The external network component 140 communicates with the mobile device 120-i and may be instructed by the LGA, installed in the mobile device 120-i, to perform certain bandwidth consuming tasks. Such tasks include, for example, periodically refreshing a web page or retrieving a new e-mail that has arrived. The network component 140 is configured to perform such tasks, rather than the mobile device 120-i performing them, thereby conserving both the device's 120-i data bandwidth and power.

To this end, the network component 140 communicates with the servers 130-1 to 130-m on behalf of the mobile device 120-i for these purposes and communicates with the mobile device 120-i as may be necessary. The network component 140 may be, but is not limited to, a proxy server, a local proxy server, a virtual private network (VPN) server, a traffic shaper, a router, a network address translator (NAT), and the like, that are operative between a client, i.e., a mobile device 120, and a server 130. The network component 140 is enabled to perform a variety of tasks as explained in more detail herein below, that causes the wireless communication between the mobile device 120-i to consume less bandwidth, thereby reducing the costs associated with the operation of the mobile device 120-i. It should be further noted that though a single network component 140 is shown herein a plurality of network components may be used without departing from the scope of the invention.

Figure 2:
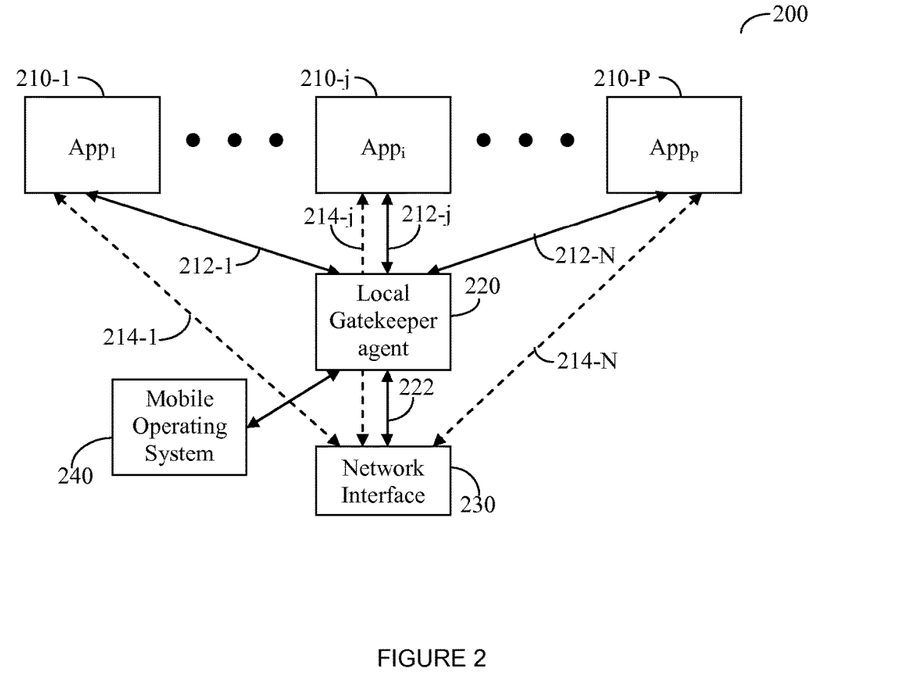
FIG. 2 is a schematic diagram of a communication scheme within a mobile device according to one embodiment.

FIG. 2 depicts an exemplary and non-limiting embodiment 200 of the communication scheme within a mobile device. A plurality of applications 210-j (j=1, 2, . . . P) execute in a multi-tasking mode. Each of the applications 210-1 to 210-P may at any given point in time request access to the network 110 (FIG. 1) for the purpose of data communication performed through the network interface 230. The LGA 220 is also installed on a mobile device 120-i (not shown in FIG. 2) and further operative in the multi-tasking mode, hence at all times the LGA 220 is active on the mobile mode, and is able to respond to such requests for access to the network interface 230. When an application 210, for example, an application 210-j attempts to access the network interface 230 over a communication link, 214-j is captured by the LGA 220 which determines if the application 210-j may communicate data freely with the network interface 230.

If that is the case, data communication continues to be performed over the link 214-j. However, if the LGA 220 determines that the application 210-j may not communicate freely with the network interface 230, the data communication is directed as such so that the application 210-j communicates over a communication link 212-j with the LGA 220, and the LGA 220 communicates on behalf of the application 210-j over communication link 222. When doing so, the LGA 220 may perform a plurality of operations with respect to the data communication request as discussed in more detail herein below. In an embodiment, over the link 212-j the LGA autonomously emulates communication of an application 210-j through the data network to reduce the bandwidth usage by the application. When such connection is emulated the application 212-j is unaware of existence of the LGA.

It should be noted that while a single LGA 220 and a single network interface 230 have been shown herein, this should not be viewed as a limitation of the invention. In fact, a plurality of LGAs 220 may be used but for sake of simplicity are not illustrated herein. Similarly, and independently, a plurality of network interfaces 230 may be used all without departing from the scope of the invention. It should be further noted that for the purpose of autonomous identification of an application communicating via the LGA 220, the LGA 220 interrogates the mobile operating system (OS) 240 of the mobile device 120-i to identify which application of the applications 220-1 through 220-N is performing a certain communication. Thereafter the LGA 220 communicates with the identified application, for example application 220-j, in the communication standard expected by that application. With this aim, the LGA 220 is configured to be operative with specific applications, for example, applications such as a web browser, and has the necessary components for communicating in the same way. Therefore, the LGA 220 may be updated periodically with communication information for the purpose of effectively communicating with applications installed on the mobile device 120-i.

Figure 3:
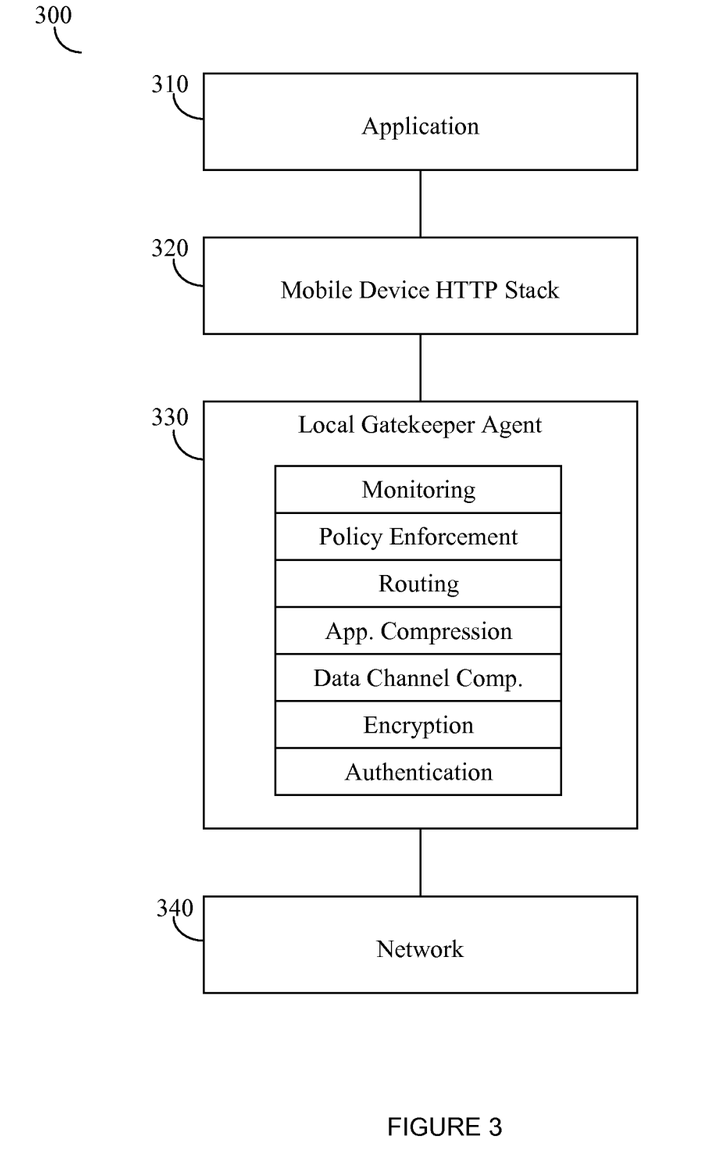
FIG. 3 is a schematic diagram of a communication stack according to one embodiment.

FIG. 3 is an exemplary and non-limiting schematic diagram of a communication stack 300 according a disclosed embodiment. The application 310 typically communicates via the mobile device hypertext transport protocol (HTTP) stack 320.

When a request for communication is performed, the LGA 330 captures the request and identifies the type of application and if action is necessary, it may perform one or more of the bandwidth reduction functions of the LGA 330. These include, but are not limited to, monitoring, communication policy enforcement, routing, application compression, data compression, encryption and authentication. The LGA 330 is responsible to communicate with the network 340 via a network interface, for example, a network interface 230. The LGA 330, in one embodiment, includes at least two data communication channels, one channel being a direct channel through which data traffic follows directly between the application 310 and the network 340. The other channel is a regulated channel such that traffic is transferred between the application 310 and the network 340 only after such data communication attempts are processed by means of one or more of the bandwidth reduction functions employed by the LGA 330.

Figure 4:
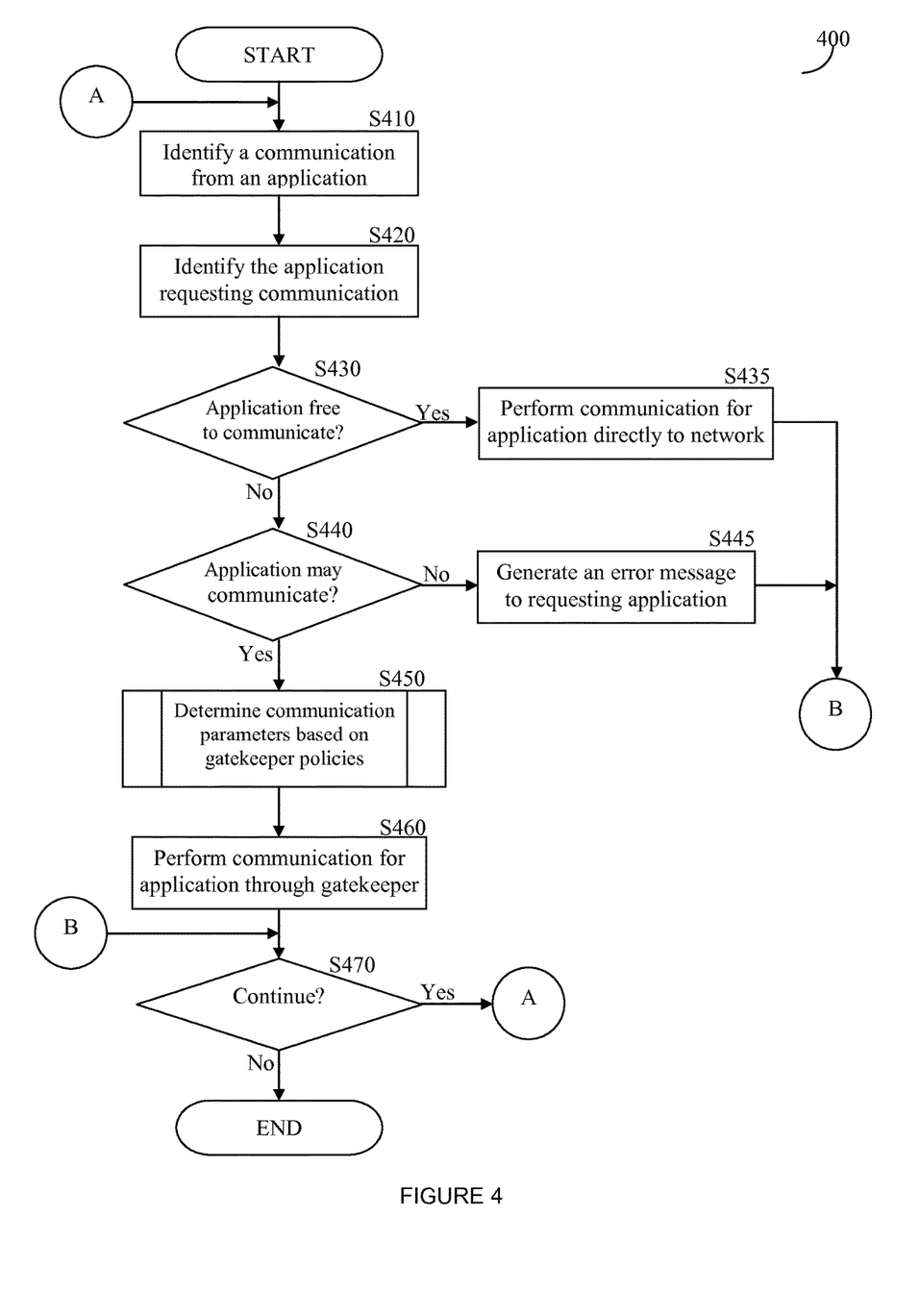
FIG. 4 is a flowchart of the operation of a local gatekeeper agent on a mobile device according to one embodiment.

FIG. 4 shows an exemplary and non-limiting flowchart 400 of the operation of a LGA on a mobile device according to one embodiment. FIG. 4 is described also with reference to the various elements shown in FIG. 2. In S410, the mobile device 120-*i* identifies a communication from an application, for example, application 210-*j*. In S420, the LGA 220 identifies the application requesting the communication. In S430, it is checked whether the application 210-*j* may have free communication with the network interface 230, and if not execution continues with S440; otherwise, execution continues with S435 where uninterrupted communication between the application 210-*j* and the network interface 230 is enabled and execution then continues with S470.

In S440, it is checked whether the application 210-*j* may communicate a request for data, and if so execution continues with S450; otherwise, execution continues with S445 where a notification is generated and sent to the application 210-*j* reporting an error after which execution continues with S470. The checks in S430 and S440 may be performed against a network access policy maintained, for example, in the LGA 220. In an embodiment, the network access policy defines for each application, installed in the device 120-*i*, whether the application can freely access the data network, can access the network with certain restrictions (e.g., certain time of the data or up to a certain bandwidth usage, a certain type of network), or cannot access the network at all. The policy may also define, for each "restricted access network", which bandwidth reduction function and/or communication policy to apply. The network access policy may also include an updated bandwidth usage value and the allowable data usage as defined in the data plan of the user. This can allow blocking data communication access through the cellular network when the user reaches his/her quota. The network access policy may be defined by the user and/or a vendor of the LGA 220. In S450, based on the determination of the application 210-*j* type, for example an e-mail application, a web application, and so on, a specific communication policy appropriate for the specific communication pattern is enforced. The communication policy may be different from one application to another and may be determined based on the specific needs of the user. For example, and without limitations, in the case for requesting to check the e-mail box on an e-mail server, the communication policy may allow this to happen every minute if connected over a free WiFi network, but only once an hour if the mobile device is connected over the cellular network. The communication policy may allow, while on a WiFi network, full upload and/or download of attached files, but not while connected over a cellular network where compression or removal schemes may be used. The communication policy applied allows the user to actively control at least the bandwidth consumption of the mobile device without needing to deal with each application separately.

Furthermore, the LGA 220 may communicate with the network component 140 for the purpose of determining a desired policy enforcement for particular applications. For example, in the case of a web application requesting a video clip, the network component may provide a lower resolution video clip so as to reduce the required bandwidth. That can be done either by the network component 140 itself or by means of identifying another source for providing a desired resolution video clip. In S470, it is checked if it is necessary to continue the method, and if so execution continues with S410; otherwise, execution terminates.

The embodiments disclosed herein are implemented as hardware, firmware, software, or any combination thereof. Moreover, the software is preferably implemented as an application program tangibly embodied on a program storage unit or tangible computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The memory may be a volatile memory, non-volatile memory or any combination thereof. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. All or some of the servers maybe combined into one or more integrated servers. Furthermore, a non-transitory computer readable medium is any computer readable medium except for a transitory propagating signal. The display segments and mini-display segments may be shown on a display area that can be a browser or another other appropriate application, either generic or tailored for the purposes described in detail hereinabove.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A mobile device, comprising:
   an interface to a data communication network;
   at least one memory unit storing a plurality of applications, a local gateway application communicatively connected to the plurality of applications, and an operating system communicatively coupled to, and separate from, the local gateway application; and
   at least one processing unit operative in a multi-tasking mode connected to the at least one memory unit and connected to the interface for executing any of the plurality of applications and the local gateway application, wherein the local gateway application is further configured to:
   capture a plurality of data communication attempts through the data communication network by any application;
   identify one of the plurality of applications as the source of the data communication attempts;

determine, for the identified application, data communication access rights based on a network access policy, the data communication access rights determining whether the identified application attempting communication may communicate with the interface;

in response to determining that the application may not communicate directly with the interface, aggregate a plurality of data communication attempts received from the identified application, and perform the aggregated captured data communications on behalf of the identified application via the interface; and in response to determining that the identified application may communicate directly with the interface, permitting the identified application to perform the captured data communication via the interface;

wherein the local gateway application is communicatively coupled to a network component and is configured to instruct the network component to perform one or more bandwidth consuming tasks on behalf of the mobile device; and wherein the local gateway application is periodically updated with respect of communication parameters of one or more of the plurality of applications.

2. The mobile device of claim 1, wherein the local gateway application is configured to identify the application autonomously of the application.

3. The mobile device of claim 1, wherein the local gateway application is configured to perform at least one of: enforce a communication policy on the captured data communication, perform routing of the communication, retrieve a lower-resolution video clip in response to a request for a video clip, perform data channel compression, perform encryption, or perform authentication.

4. The mobile device of claim 1, wherein the network access policy specifies, for an application, at least one of: rejecting a communication request by the application, allowing the application to communicate using the interface to the data communication network, or performing communication with the interface to the data communication network under the control of the local gateway agent.

5. The mobile device of claim 1, wherein the network component is at least one of: a proxy server, a virtual private network (VPN) server, a traffic shaper, a router, or a network address translator (NAT).

6. The mobile device of claim 1, wherein the mobile device is at least one of: a smart phone or a tablet personal computer (PC).

7. The mobile device of claim 2, wherein the local gateway application is configured to interrogate the operating system for information to identify the requesting application.

8. The mobile device of claim 7, wherein the network access policy defines, for an application that may not communicate directly with the interface, at least one of: a bandwidth reduction function to apply to the data communication attempt, a communication policy to apply to the data communication attempt, or an updated bandwidth usage value and an allowable data usage value for a data plan used by the mobile device.

9. A method for management of communication from a mobile device capable of multi-tasking, comprising:
capturing, by a local gateway application executing on the mobile device, a plurality of requests from any of a plurality of applications executing on the mobile device, the requests to communicate data through a network interface of the mobile device, the local gateway application separate from an operating system of the mobile device;

identifying one of the plurality of applications as a source of the requests for data communication attempts;

instructing a network component to perform bandwidth consuming tasks on behalf of the mobile device;

determining, by the local gateway application, data communication rights for the identified requesting application based on a network access policy, the data communication access rights determining whether the identified requesting application may communicate with the network interface for a first request to communicate data;

in response to determining that the identified requesting application may not communicate directly with the network interface, aggregating a plurality of requests received from the identified requesting application, and performing the aggregated captured requests by the local gateway application on behalf of the identified requesting application via the interface; and in response to determining that the identified requesting application may communicate directly with the network interface, permitting the identified requesting application to perform the captured request via the interface;

wherein the local gateway application is periodically updated with respect of communication parameters of one or more of the plurality of applications.

10. The method of claim 9, further comprising identifying the requesting application without interrogation of the requesting application.

11. The method of claim 9, wherein performing the captured request further comprises at least one of: enforcing a communication policy on the request to communicate, routing the request to communicate, retrieving a lower-resolution video clip in response to the request to communicate being a request for a video clip, performing data channel compression, performing encryption, or performing authentication.

12. The method of claim 9, wherein the network access policy specifies, for an application, at least one of: rejecting the request to communicate data, allowing the requesting application to communicate using the network interface to a data communication network, or regulating the bandwidth usage by the requesting application.

13. The method of claim 9, wherein the network component is any one of: a proxy server, a virtual private network (VPN) server, a traffic shaper, a router, and a network address translator (NAT).

14. The method of claim 9, wherein the mobile device is at least one of: a smart phone or a tablet personal computer (PC).

15. An article comprising at least one non-transitory computer-readable storage medium containing instructions that, when executed by a processor, cause a system to:
capture, by a local gateway application, a plurality of requests from any of a plurality of applications executing on a mobile device, the request to communicate data through a network interface of the mobile device, the local gateway application separate from an operating system executing on the mobile device;

instruct a network component to perform bandwidth consuming tasks on behalf of the mobile device;

determine data communication access rights for the identified requesting application based on a network access policy, the data communication access rights determining whether the identified requesting application may communicate with the network interface;

in response to determining that the identified requesting application may not communicate directly with the network interface, aggregate a plurality of data communication requests received from the identified requesting application, and perform the aggregated captured requests by the local gateway application on behalf of the identified requesting application; and in response to determining that the identified requesting application may communicate directly with the network interface, permit the identified requesting application to perform the captured request via the interface;

wherein the local gateway application is periodically undated with respect of communication parameters of one or more the plurality of applications.

16. An article comprising a non-transitory computer-readable storage medium including instructions for a local gateway application, the local gateway application comprising:

a first interface to a plurality of applications executed on a mobile device, wherein the first interface is configured to capture a plurality of requests from a plurality of applications, the requests to communicate data through a network interface of the mobile device;

a second interface to an operating system of the mobile device, wherein the local gateway application is external to the operating system and is configured to interrogate the operating system for information to identify the requesting application;

a network access policy specifying, for a requesting application, data communication access rights determining whether the requesting application may communicate with the network interface;

a first data link that aggregates a plurality of data communication request received later from the requesting application, and performs the aggregated requested data communications on behalf of the requesting application through the network interface without interfering with normal operation of the requesting application, when the network access policy requires regulating bandwidth usage by the requesting application; and a second data link through which the requesting application communicates with the network interface without regulation by the local gateway application, when the network access policy does not require regulating bandwidth usage by the requesting application;

wherein the local gateway application is communicatively coupled to a network component and is configured to instruct the network component to perform one or more bandwidth consuming tasks on behalf of the mobile device; and wherein the local gateway application is periodically updated with respect of communication parameters of one or more the plurality of applications.

* * * * *